United States Patent
Hackworth

(10) Patent No.: US 8,171,414 B2
(45) Date of Patent: May 1, 2012

(54) SYSTEM AND METHOD FOR CONSOLIDATED REPORTING OF CHARACTERISTICS FOR A GROUP OF FILE SYSTEMS

(75) Inventor: Brian M. Hackworth, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1729 days.

(21) Appl. No.: 09/862,949

(22) Filed: May 22, 2001

(65) Prior Publication Data

US 2002/0175938 A1 Nov. 28, 2002

(51) Int. Cl.
G06F 15/177 (2006.01)

(52) U.S. Cl. ........ 715/736; 715/772; 715/859; 715/861; 715/733; 715/764

(58) Field of Classification Search .................. 345/751, 345/772, 859, 861, 733, 736, 767, 738, 781; 709/201–203, 223, 224; 715/751, 777, 859, 715/861, 733, 736, 764, 738, 781, 772
See application file for complete search history.

(56) References Cited

U.S. PATENT DOCUMENTS

| | | | |
|---|---|---|---|
| 4,521,871 A | 6/1985 | Galdun et al. | |
| 4,829,297 A | 5/1989 | Ilg et al. | |
| 4,876,664 A | 10/1989 | Bittorf et al. | |
| 4,937,777 A | 6/1990 | Flood et al. | |
| 5,193,189 A | 3/1993 | Flood et al. | |
| 5,287,548 A | 2/1994 | Flood et al. | |
| 5,627,745 A | 5/1997 | Flood | |
| 5,678,042 A * | 10/1997 | Pisello et al. | 714/47 |
| 5,777,874 A | 7/1998 | Flood et al. | |
| 5,819,028 A * | 10/1998 | Manghirmalani et al. | 714/57 |
| 5,819,292 A | 10/1998 | Hitz et al. | |
| 5,912,814 A | 6/1999 | Flood | |
| 5,933,347 A | 8/1999 | Cook et al. | |
| 5,948,110 A | 9/1999 | Hitz et al. | |
| 5,950,225 A | 9/1999 | Kleiman | |
| 5,963,448 A | 10/1999 | Flood et al. | |
| 5,963,962 A | 10/1999 | Hitz et al. | |
| 5,966,300 A | 10/1999 | Flood et al. | |
| 5,966,301 A | 10/1999 | Cook et al. | |
| 5,966,304 A | 10/1999 | Cook et al. | |
| 5,997,166 A | 12/1999 | Flood | |
| 6,038,570 A | 3/2000 | Hitz et al. | |
| 6,049,775 A * | 4/2000 | Gertner et al. | 705/8 |
| 6,119,244 A | 9/2000 | Schoenthal et al. | |
| 6,138,126 A | 10/2000 | Hitz et al. | |
| 6,233,600 B1 * | 5/2001 | Salas et al. | 709/201 |
| 6,320,585 B1 * | 11/2001 | Engel et al. | 345/440 |
| 6,346,954 B1 * | 2/2002 | Chu et al. | 715/764 |
| 6,430,711 B1 * | 8/2002 | Sekizawa | 714/47 |
| 6,505,256 B1 * | 1/2003 | York | 709/246 |
| 6,633,912 B1 * | 10/2003 | Welter et al. | 709/224 |
| 7,107,534 B1 * | 9/2006 | de Jong et al. | 715/734 |

* cited by examiner

*Primary Examiner* — Simon Ke
(74) *Attorney, Agent, or Firm* — Cesari and McKenna, LLP

(57) ABSTRACT

A system and method enables one or more storage volumes and associated devices on one or more storage appliances (filers) to be combined or consolidated into arbitrary groups so that statistical information related to performance, operational status and other usage-based parameters can be made available to interested parties associated with the group. The volumes can drawn from different storage appliances and grouped so as to allow administration and access by a common group of administrators or users. The statistical information can be compared to threshold values to generate events. The events can be e-mailed or otherwise transmitted to interested parties. The statistical information can also be organized and displayed in a variety of formats as a web page on a graphical user interface that resides on a management station and/or client display of an interested party.

34 Claims, 14 Drawing Sheets

SYSTEM AND METHOD FOR CONSOLIDATED REPORTING OF CHARACTERISTICS FOR A GROUP OF FILE SYSTEMS

FIELD OF THE INVENTION

The present invention relates to networked storage systems and more particularly to systems for reporting status and other information with respect to volumes within a networked storage system environment.

BACKGROUND OF THE INVENTION

A network storage appliance is a special-purpose computer that provides file service relating to the organization of information on storage devices, such as disks. The network storage appliance or filer includes an operating system that implements a file system to logically organize the information as a hierarchical structure of directories and files on the disks. Each "on-disk" file may be implemented as a set of disk blocks configured to store information, such as text, whereas the directory may be implemented as a specially formatted file in which information about other files and directories are stored. An example of a file system that is configured to operate on a filer is the Write Anywhere File Layout (WAFL™) file system available from Network Appliance, Inc., Santa Clara, Calif.

A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link or a shared local area network (LAN) or wide area network (WAN). Each client may request the services of the filer by issuing file system protocol messages (in the form of packets) to the filer over the network.

A filer is organized so that it includes one or more of storage "volumes" that comprise a cluster of physical storage disks, defining an overall logical arrangement of storage space. Currently available filer implementations can serve a large number of discrete volumes (for example 150, although this number is subject to increase). Each volume is generally associated with its own file system (WAFL for example). The disks within a volume/file system are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL-based file system, a RAID 4 implementation is advantageously employed. This implementation specifically entails the striping of data across a group of disks, and separate parity caching within a selected disk of the RAID group.

A complex distributed storage arrangement typically requires monitoring and administration of various devices (e.g. disks, filers, etc.) by a competent network administrator at regular intervals. Expected maintenance items and unexpected alert conditions may arise, requiring intervention by the administrator. For example, physical disks may run low on storage or even occasionally malfunction, or other significant events may impair function of a particular volume or of the entire network. In such cases, the administrator should be alerted so that he or she may take appropriate action.

Currently available network administration tools enable an operator to retrieve various status and performance information/reports from individual volumes, or from the entire array of network devices. While such reporting is valuable, it is often limited in usefulness, particularly where a large network of disparate users is present. For example, a large organization such as a bank may have a variety of separate departments, each having its own requirements and characteristics of network use. In order to effectively monitor and administer the various departments it is desirable to divide volumes into separate reporting groups. In addition, it may be desirable to selectively group certain volumes into more than one group where a given volume may cross certain departmental lines. For example upper management may wish to view data from a variety of departments, that are otherwise restricted to individuals in the particular departments. Similarly, certain departments may be subject to system alerts that are particularly critical. For example, the bank's credit card department may be more concerned about low storage than the safe deposit box department due to the relatively greater rate at which credit card transactions are accumulated. Having a low-storage alert tailored to this critical group can expedite action by the administrator.

Accordingly, it is an object of the present invention to provide a system and method for selectively grouping discrete volumes of a network storage arrangement into separate groups that may be a subset of the overall network architecture. This system and method should provide customization and versatility with respect to the type of information that are reported for the various groups and should allow alert information to be tailored to the particular group.

SUMMARY OF THE INVENTION

This invention overcomes the disadvantages of the prior art by providing a system and method for enabling one or more storage volumes and associated devices on one or more storage appliances (filers) to be combined or consolidated into arbitrary groups so that statistical information related to performance, operational status and other usage-based parameters can be provide to interested parties associate with the group. The volumes can be drawn from different storage appliances, and their statistical information can be grouped/consolidated so as to allow administration and access by a common group of administrators or users.

According to a preferred embodiment, the grouping of volumes is controlled via a management station that is attached to the network containing the volumes. The management station includes a graphical user interface that allows the groups to be organized and displayed. A monitor process polls the volumes and devices for statistical information and returns it to the management station. There is a database that stores information about users in the group and various threshold values that are associated with the statistical information. The monitor process compares the thresholds to the monitored statistical information and determines whether an event has occurred. If an event has occurred, then the monitor process notifies an event process that determines whether there are listed any interested parties in the event, and, if so, how to notify the parties. In a typical form of notification, the event process can e-mail at least some of the interested parties in the group (e.g. users, administrators, managers) if an event has occurred. Similarly, the notification can take the form of an alarm, alert, telephone call or page to an interested party that is implemented through appropriate automated systems. There is also a command process that generates displays on the statistical information using, preferably a web-based format that is accessed by a browser on the management station's graphical user interface or on an interested party's client display.

According to a preferred embodiment, the graphical user interface can display statistical information in connection with the group in a variety of formats that can be organized based upon the group's volumes, the devices within volumes (e.g. disks), the storage appliances implicated by the group, or with respect to selected events or alerts. The information can include color-coded alert information or status displays that show the relative severity of the problem associated with the event/alert (e.g. low storage, disk failure and the like).

According to another aspect of the invention statistical information stored on the database resulting from the polling of the monitor process can be bundled in various time periods (e.g. days, weeks, quarters) that each have roughly the same number of intervals, each bundle having a different relative time span between respective intervals. In this manner samples for more recent time periods are maintained in smaller intervals, while samples for older time periods are maintained at successively longer sample intervals. This reduces the concomitant burden on the database.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

Figure 1:
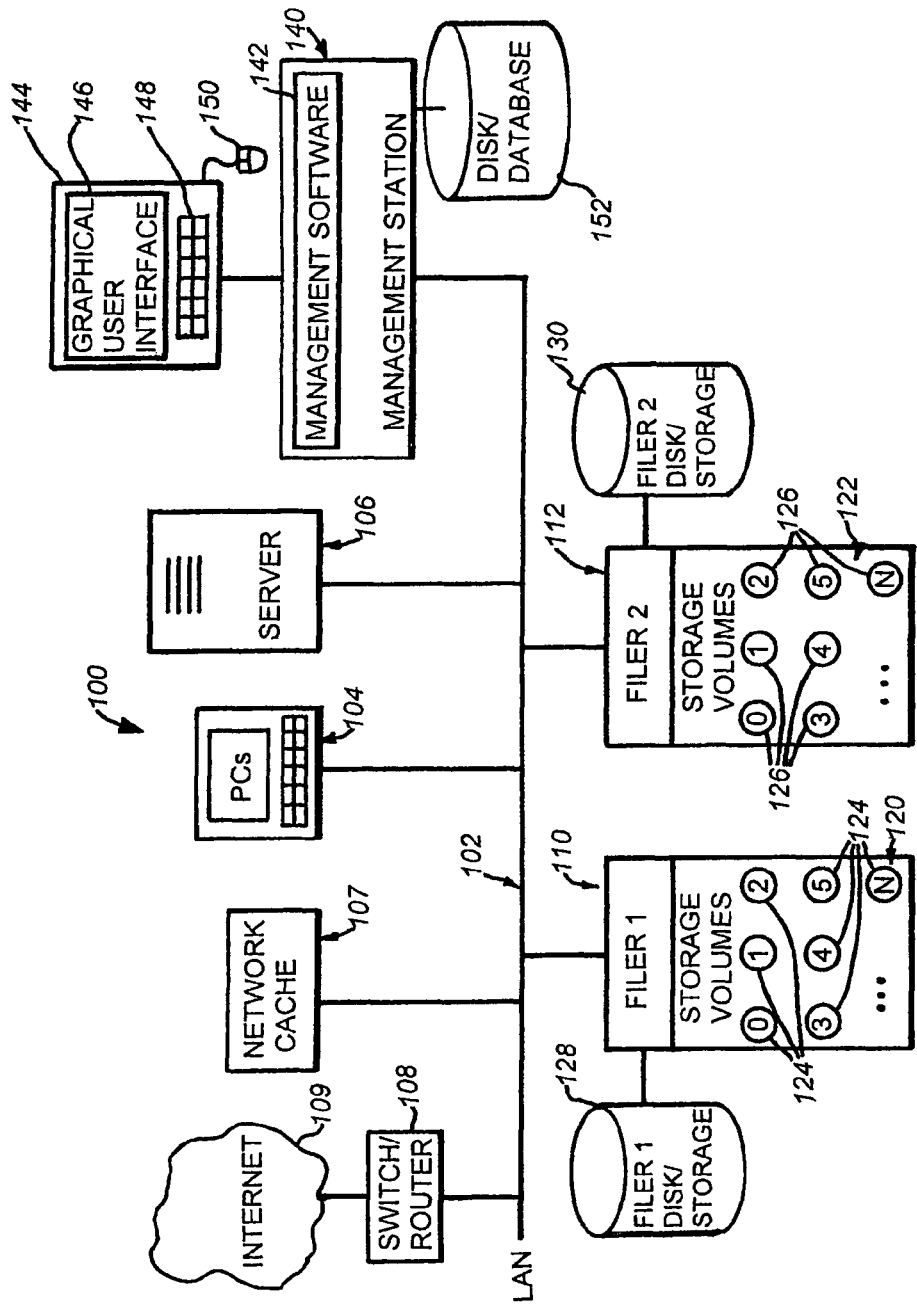
FIG. 1 is a schematic block diagram of a network environment including various networked devices including exemplary network storage appliances having filers and associated volumes, and a management station according to an embodiment of this invention.

FIG. 1 is a schematic block diagram of an exemplary network environment 100 in which the principles of the present invention are implemented. The network 100 is based around a local area network (LAN) interconnection 102. However, a wide area network (WAN), virtual private network (VPN) implementation (utilizing communication links over the Internet, for example), or a combination of LAN, WAN and VPN implementations can be established. For the purposes of this description, the term "LAN" should be taken broadly to include any acceptable networking architecture. The LAN 102 interconnects various clients based upon personal computers (PCs) 104, servers 106 and a network cache 107. Also interconnected to the LAN may be a switch/router 108 that provides a gateway to the well-known Internet 109, thereby enabling various networked devices to transmit and receive internet based information, including e-mail, web content, and the like.

In addition exemplary filers 110 and 112 (Filer1 and Filer2, respectively) are connected two the LAN. These filers, (described further below) are network storage appliances configured to control storage of, and access to, data in a set of interconnected storage volumes 120 and 122, respectively. The volumes 124, 126, respectively, are numbered 0-N. As described further below, each volume is typically organized to include one or more RAID groups of physical storage disks for increased data storage integrity and reliability. Each filer 110, 112 can also include a dedicated storage cache/disk 128, 130, respectively for filer applications and data handling functions. Each of the devices attached to LAN include an appropriate, conventional network interface arrangement (not shown) for communicating over the LAN using desired communication protocols, such as the well-known Transport Control Protocol/Internet Protocol (TCP/IP), User Datagram Protocol (UDP), Hypertext Transfer Protocol (HTTP) or Small Network Management Protocol (SNMP).

Also connected to the LAN 102 is a management station 140 according to a preferred embodiment of this invention. The management station 140 can include a server or PC-based computer with a network interface for communicating over the LAN. Within the management station 140 resides the management software 142, the function of which is described further below. In general, the software 142 enables an administrator or other operator to access usage and performance information with regard to various LAN-connected devices, including the filers 110 and 112 and associated volumes 124, 126. The management station utilizes an SNMP communication process to obtain and manipulate this information. This protocol is designed to enable networks to be remotely managed from a centralized management station. In particular it comprises a packet-based protocol using messaging to communicate with networked devices and clients. The messages are provided as management information blocks (MIBs). The MIBs and SNMP protocol, and their use in providing network management information between SNMP management stations and agents are well-known and described in SNMP, SNMPv2 and RMON by William Stallings, printed by Addison Wesley Publishing Company, 1996. The information is displayed and manipulated using a graphical user interface (GUI) 144 that can include a display 146, keyboard 148 and mouse 150 (or other GUI-compatible device, such as a touch-screen). In addition a storage disk 152 or other memory device is interconnected with the management station computer 140. This storage 152 holds database information on various devices and their associated statistics as well as other data related to management station operations and functions. The configuration of the storage can be based upon RAID or another architecture.

Figure 2:
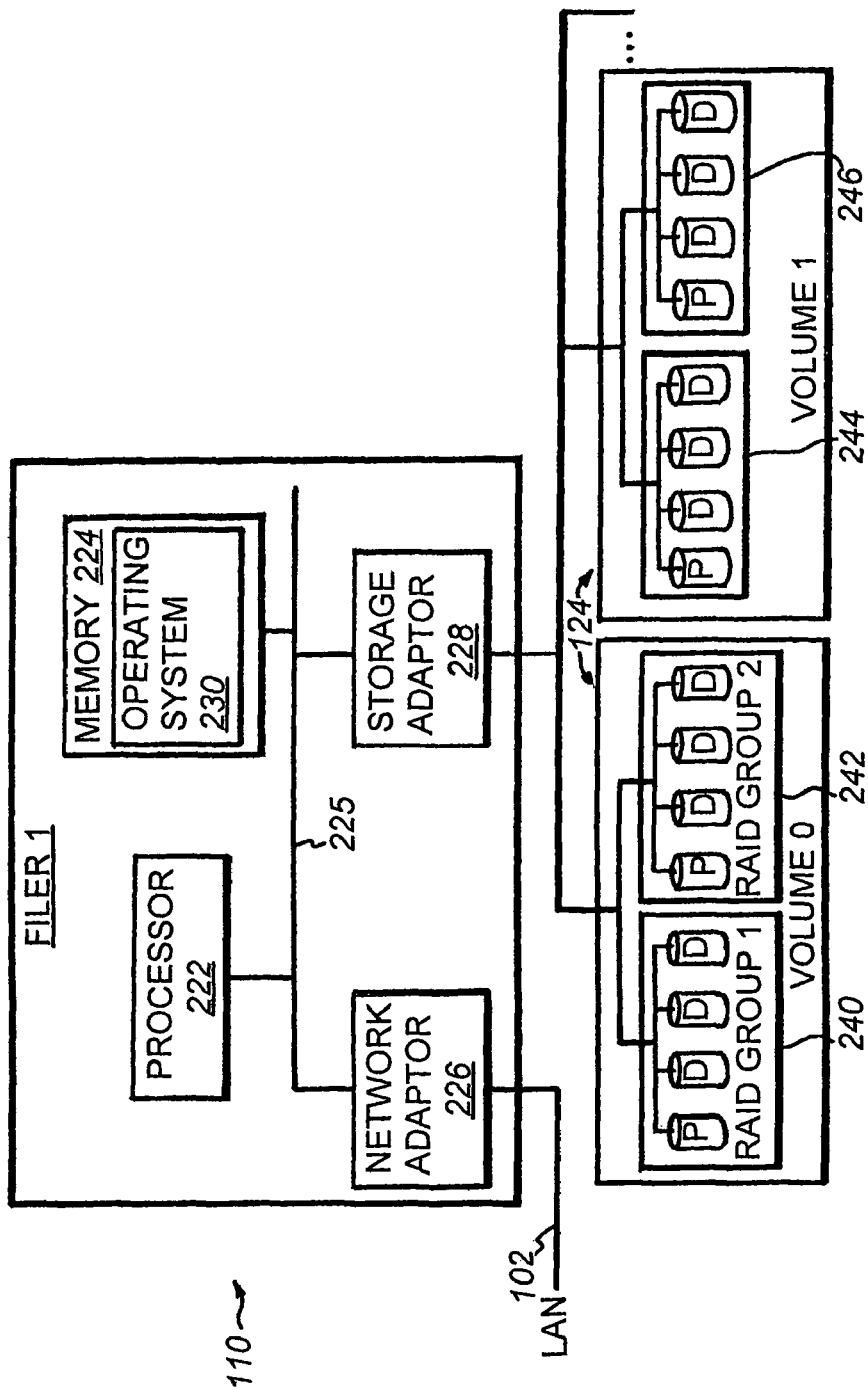
FIG. 2 is a more-detailed schematic block diagram of an exemplary network storage appliance in accordance with FIG. 1.

Before describing the structure and functions of the management station in further detail, the exemplary filer architecture is now described in further detail. FIG. 2 is a more-detailed schematic block diagram of the exemplary network storage appliance 110 (Filer1) that is advantageously used with the present invention. Other filers can have similar construction (including exemplary Filer2 112). By way of background, a network storage appliance or filer is a special-purpose computer that provides file service relating to the organization of information on storage devices, such as disks. However, it will be understood to those skilled in the art that the inventive concepts described herein may apply to any type of special-purpose (e.g., server) or general-purpose computer, including a standalone computer. The filer 110 comprises a processor 222, a memory 224, a network adapter 226 and a storage adapter 228 interconnected by a system bus 225. The filer 110 also includes an operating system 230 that implements a file system to logically organize the information as a hierarchical structure of directories and files on the disks.

In the illustrative embodiment, the memory 224 may have storage locations that are addressable by the processor and adapters for storing software program code and data structures associated with the present invention. The processor and adapters may, in turn, comprise processing elements and/or logic circuitry configured to execute the software code and manipulate the data structures. The operating system 230, portions of which are typically resident in memory and executed by the processing elements, functionally organizes the filer 110 by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 226 comprises the mechanical, electrical and signaling circuitry needed to connect the filer 110 to a client 104 (including management station 140) (see FIG. 1) over the computer network (LAN 102), which, as described generally above, can comprise a point-to-point connection or a shared medium, such as a local area network. A client (104, 140) can be a general-purpose computer configured to execute applications including file system protocols, such as the Common Internet File System (CIFS) protocol. Moreover, the client can interact with the filer 110 in accordance with a client/server model of information delivery. That is, the client may request the services of the filer, and the filer may return the results of the services requested by the client, by exchanging packets that encapsulate, e.g., the CIFS protocol format over the network 102. The format of the CIFS protocol packet exchanged over the network is well-known and described in *Common Internet File System (CIFS) Version: CIFS-Spec* 0.9, Storage Networking Industry Association (SNIA), Draft SNIA CIFS Documentation Work Group Work-in-Progress, Revision Date: Mar. 26, 2001 (hereinafter "CIFS specification"), which is hereby incorporated by reference as though fully set forth herein.

The storage adapter 228 cooperates with the operating system 230 executing on the filer to access information requested by the client, which information may be stored on a number of storage volumes 124 each constructed from an array of physical disks that are organized as RAID groups 240, 242, 244 and 246. The RAID groups include independent physical disks including those storing striped data (D) and those storing separate parity (P) for the data, in accordance with a preferred RAID 4 configuration. However, other configurations (e.g. RAID 5) are also contemplated.

The storage adapter 228 includes input/output (I/O) interface circuitry that couples to the disks over an I/O interconnect arrangement, such as a conventional high-performance, Fibre Channel serial link topology. The information is retrieved by the storage adapter 228 and, if necessary, processed by the processor 222 (or the adapter 228 itself) prior to being forwarded over the system bus 125 to the network adapter 126, where the information is formatted into a packet and returned to the client 110.

To facilitate access to the disks 130, the operating system 200 implements a file system that logically organizes the information as a hierarchical structure of directories and files on the disks. Each "on-disk" file may be implemented as set of disk blocks configured to store information, such as text, whereas the directory may be implemented as a specially formatted file in which other files and directories are stored. In the illustrative embodiment described herein, the operating system 230 associated with each volume is preferably the NetApp® Data ONTAP™ operating system available from Network Appliance, Inc. of Sunnyvale, Calif. that implements a Write Anywhere File Layout (WAFL) file system. The preferred operating system for the exemplary filer is now described briefly. However, it is expressly contemplated that the principles of this invention can be implemented using a variety of alternate operating system architectures.

Figure 3:
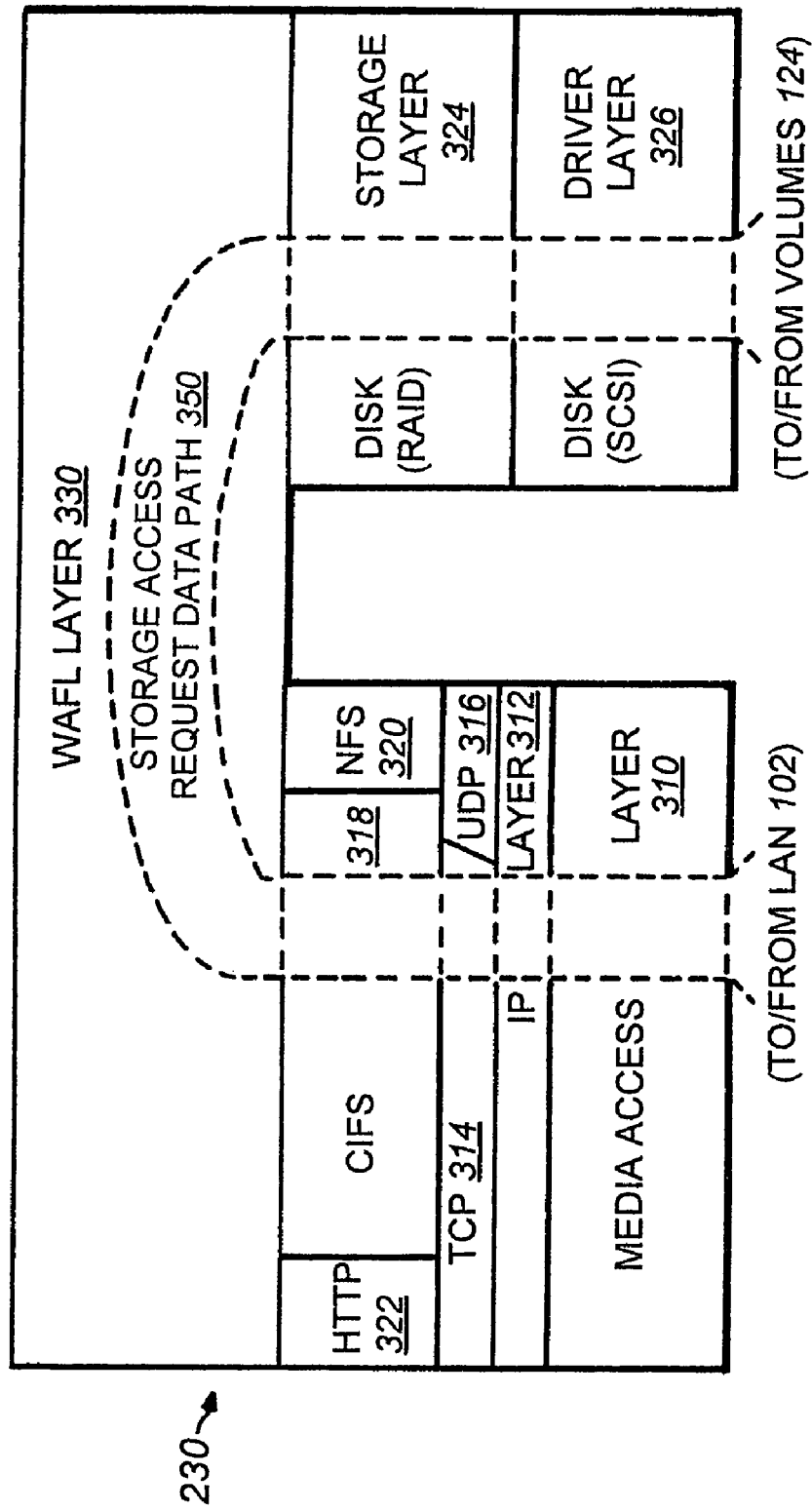
FIG. 3 is a schematic block diagram of an operating system for use with the exemplary network storage appliance of FIG. 2 according to an embodiment of this invention.

As shown in FIG. 3, the operating system 230 comprises a series of software layers, including a media access layer 310 of network drivers (e.g., an Ethernet driver). The operating system 230 further includes network protocol layers, such as the IP layer 312 and its TCP layer 314, and UDP layer 316. A file system protocol layer 318 provides multi-protocol data access and, to that end, includes support for the CIFS protocol, the Network File System (NFS) protocol 320 and the HTTP protocol 322. In addition, the operating system 230 includes a disk storage layer 324 that implements a disk storage protocol, such as a RAID protocol, and a disk driver layer 326 that implements a disk access protocol such as, e.g., a Small Computer Systems Interface (SCSI) protocol. Bridging the disk software layers with the network and file system protocol layers is a WAFL file system layer 330 of the operating system. Generally, the WAFL layer implements the WAFL file system having an on-disk format representation that is block-based using, e.g., 4-kilobyte (KB) data blocks and using inodes to describe the files. The WAFL file system generates operations to load (retrieve) the requested data from volumes 124 if it is not resident "in-core", i.e., in the filer's memory 224. If the information is not in memory, the WAFL layer 330 indexes into the inode file using the inode number to access an appropriate entry and retrieve a logical volume block number. The WAFL layer then passes the logical volume block number to the disk storage (RAID) layer 324, which maps that logical number to a disk block number and sends the latter to an appropriate driver (e.g., SCSI) of the disk driver layer 326. The disk driver accesses the disk block number from volumes 124 and loads the requested data in memory 224 for processing by the filer 110. Upon completion of the request, the filer (and operating system) returns a reply, e.g., a conventional acknowledgement packet defined by the CIFS specification, to the client 104, 140 over the network 102. It should be noted that the software "path" 350 through the operating system layers described above needed to perform data storage access for the client request received at the filer may alternatively be implemented in hardware.

Figure 4:
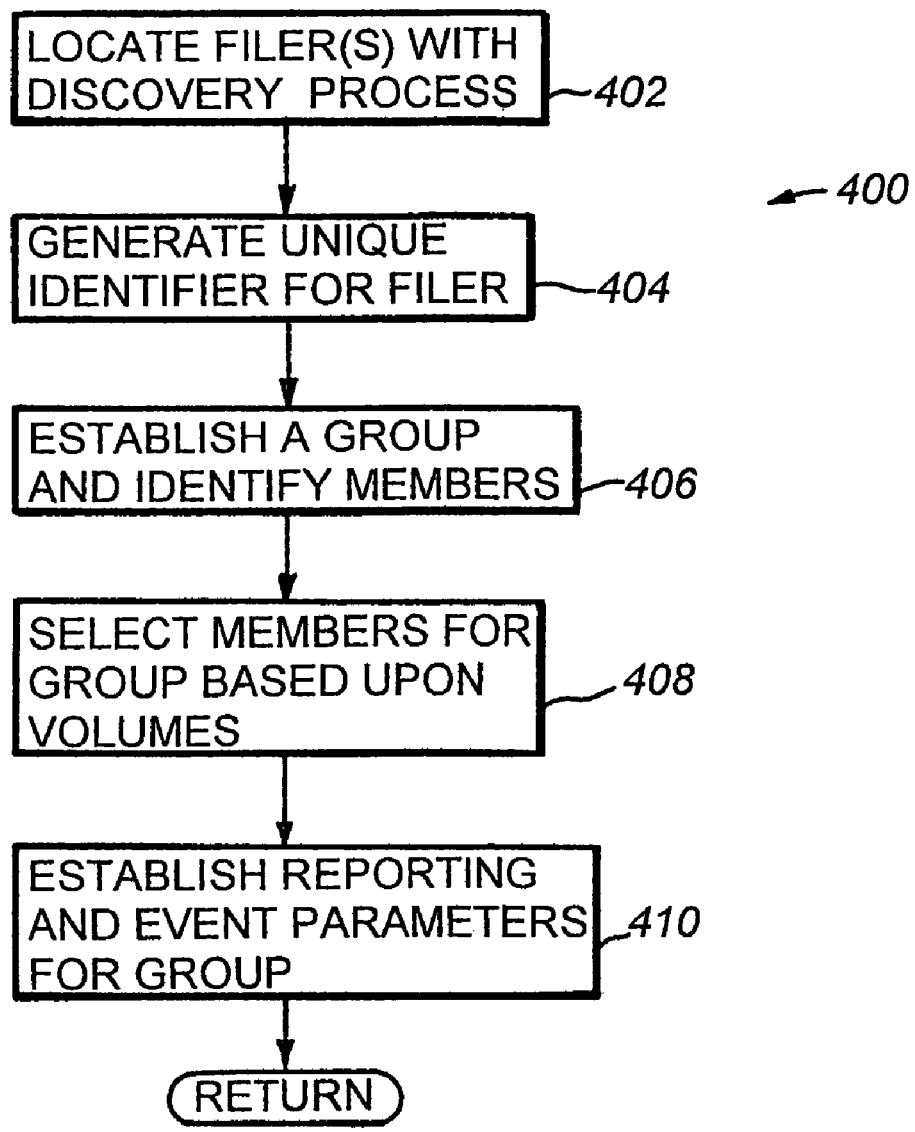
FIG. 4 is a flow diagram of a generalized procedure for building volume groups according to an embodiment of this invention.
Figure 5:
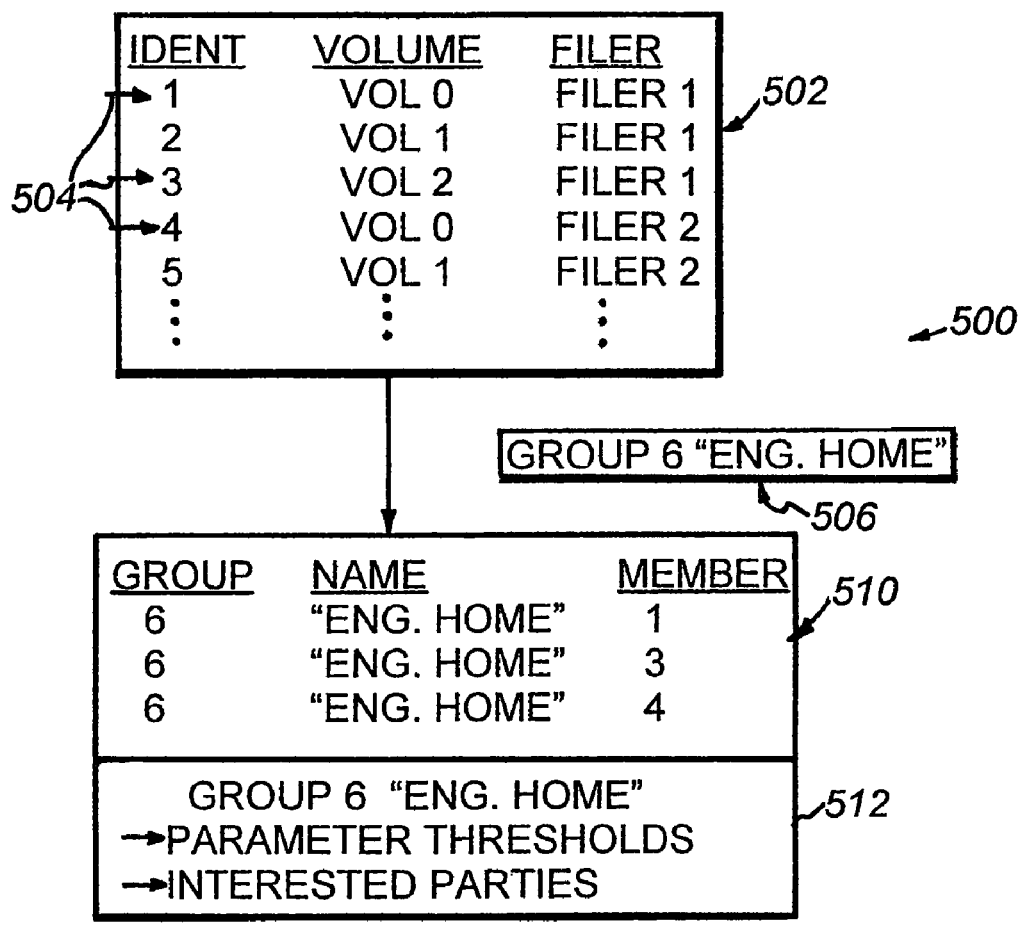
FIG. 5 is a schematic block diagram of an exemplary group building procedure in accordance with the procedure of FIG. 3.

According to one aspect of the invention, the separate volumes 124 can be grouped according to predetermined criteria to create reporting groups that are used advantageously. Reference is made to FIGS. 4 and 5, which show, respectively, a procedure 400 for grouping volumes and an associated graphical representation 500 of an exemplary grouping. The procedure can be implemented by an administrator using the management station 140 and the graphical representation may be generally symbolic of the information appearing of the station's graphical user interface 144.

The procedure begins with the location of filers resident on the network and associated volumes within the filers as detailed in step 402. In this example Filer1 and Filer2 are located and displayed in association with all respective volumes (Vol0, Vol1, Vol2, etc.) as denoted by the display window 502. Volumes can be located manually be specifying the appropriate address (if such address is known), or the volumes can be located automatically by the management software using a discovery process having appropriate polling capabilities. This discovery process is part of an overall monitor process within the management station that is described further below. In general, the discovery process uses SNMP to communicate with the filers and extract desired volume information.

In accordance with step 404, the management software then generates a unique identifier for each volume in each filer. The identifiers are shown as discrete numbers 1-5. For example, Filer1, Vol0 is assigned identifier 1; Filer1, Vol2 is assigned identifier 3, and so forth.

In accordance with step 406, the administrator can establish a group which in this example is identified as "ENG. HOME" (Group 6) in this example. See selection block 506. This group can be one of a large number of groups. Each group can be defined by a set of like users/members (e.g. a department) or by certain administrative criteria (those users having high-volume storage usage or users served by a particular administrator). In general, the creation of groups and other user-directed functions implicates a command process that interacts with the management software and stores input commands and data on a database, both of which are described further below.

In accordance with step 408, one or more volumes related to the group (i.e. those containing data related to the group) are then selected for inclusion in the group. In the example of FIG. 5, the volumes identified by numbers 1, 3 and 4 are selected by flagging the selected group members using the GUI as denoted by cursor marks 504. The resulting selection is depicted in the graphical window 510. Each of the members 1, 3 and 4 are associated with Group 6 "ENG. HOME."

Finally, in accordance with step 410, any group-related reporting parameters and event parameters are assigned to the group using the GUI (window 512). In other words, various threshold values for reporting "events" or "alerts" in connection with one of the group volumes or underlying devices (disks) are associated with the group. Such event parameters (described further below) can include, but are not limited to, exceeded thresholds for device or filer central processing unit (CPU) utilization, device environmental conditions (temperature, etc.), volume free space, disk free space and NFS operations per second. In addition, the general operational state (on/off, broken/working) is reported. As described below, these parameters are generally monitored by the management software's monitor process based upon SNMP polls passed over the LAN. The reporting/polling period for various event parameters may vary based upon criticality of the parameters to normal operation and other criteria. In general, statistical information on devices within desired thresholds is also maintained for each group, and is accessed via the GUI by the management station operator/administrator.

In addition, the administrator in step 410 can establish the interested parties (other than the management station operator/administrator) to which selected information is to be reported (e.g. reporting parameters). This reporting takes the form of electronic mail (e-mail) delivered to e-mail in-boxes of the interested parties alerts using Simple Mail Transfer Protocol (SMTP) (see window 512). These interested parties can include local group administrators and particular users (for example, an identified, specific user in a group who is exceeding allotted storage maximums). The reporting process is described further below.

Figure 6:
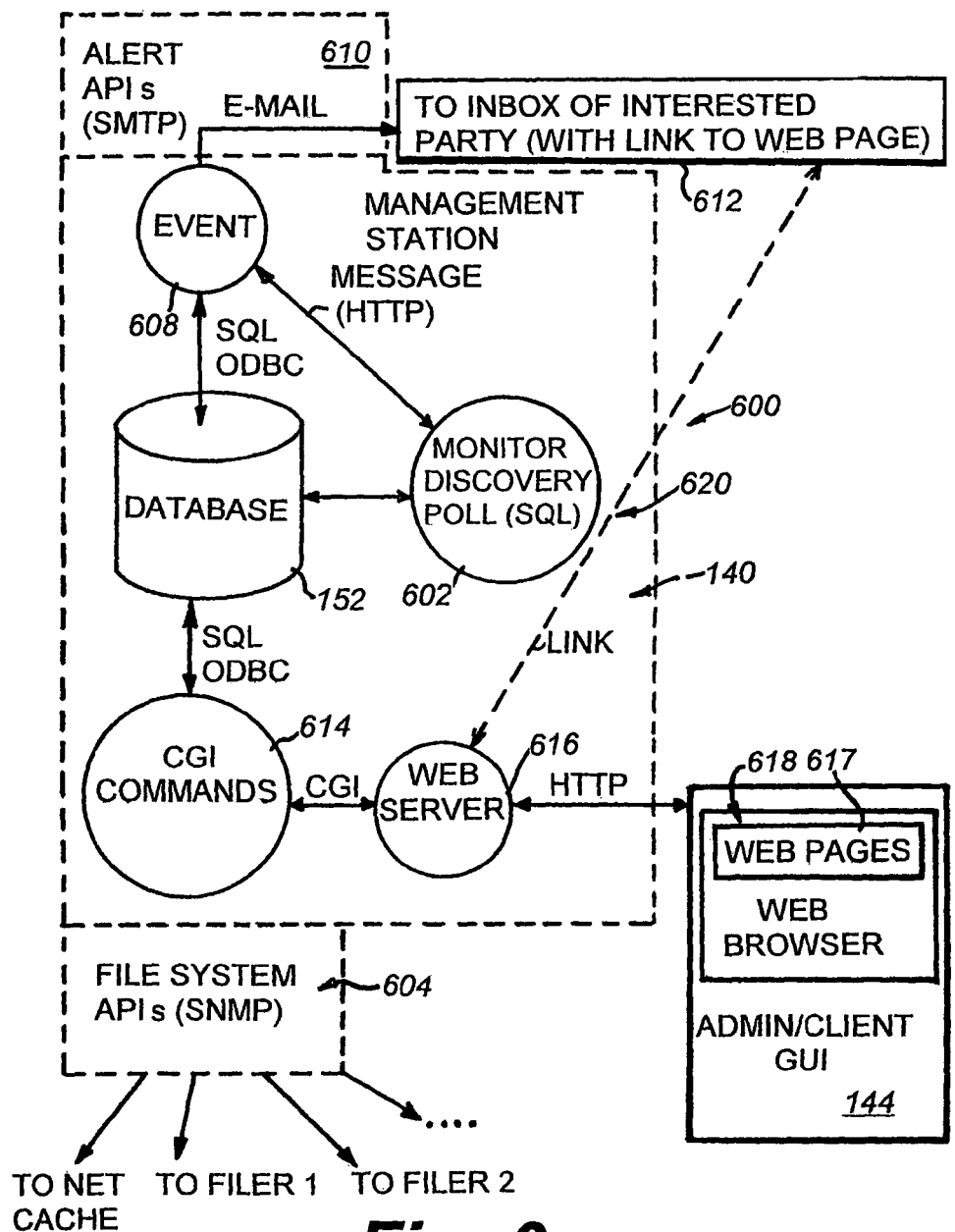
FIG. 6 is a schematic diagram of the functional architecture of the management station of FIG. 1.
Figure 7:
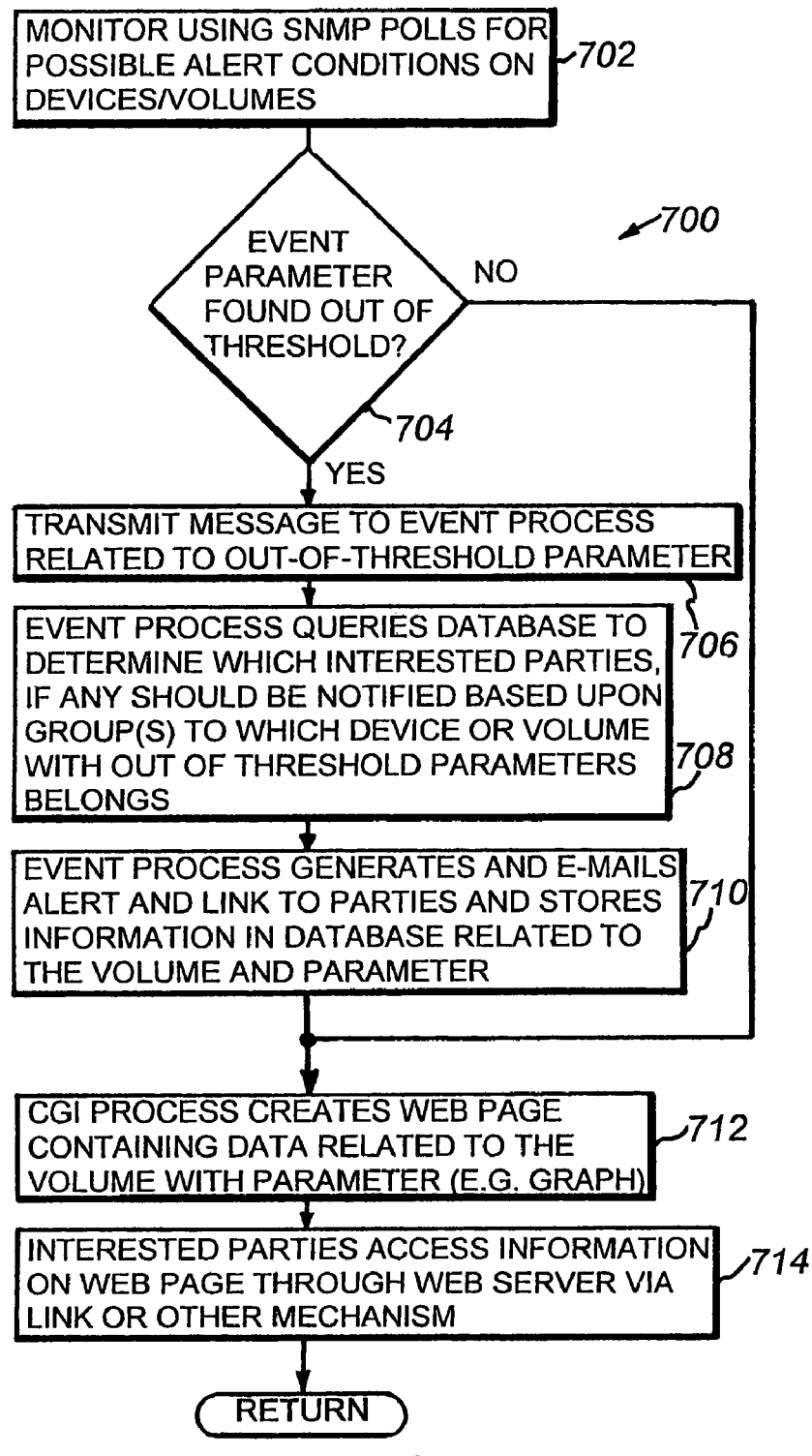
FIG. 7 is a flow diagram of a generalized procedure for monitoring and reporting events with respect to particular volumes.

FIG. 6 shows the functional layout 600 of the management station 140 and interconnected clients/filers in further detail. Likewise, FIG. 7 shows a procedure 700 for reporting specified events to interested parties in a group according to an embodiment of this invention. In accordance with the procedure 600, the monitor process 602 executes continuously, polling for event data and statistical information in connection with each volume or other polled device. The SNMP protocol is used to transfer this data over the LAN to each of the filers, net cache, etc. An appropriate file system application programming interface (API) 604 is used to support the use of SNMP in conjunction with the management station.

In accordance with decision step 704, the monitor process 602 determines whether an event has been detected requiring reporting to occur. The monitor can be supplied with the appropriate threshold values, either stored by the administrator or preset in the database 152. The monitor performs a comparison of received statistical information to threshold information contained in the database. According to one embodiment, the database 152 is a relational-type database commercially available from Sybase of Emeryville, Calif. However, any acceptable data-storage arrangement can be employed. In this embodiment, the database 152 can be organized and accessed using Structured Query Language (SQL) and the Open DataBase Connectivity (ODBC) standard. If an event occurs, such as an out-of-threshold parameter, the decision step branches to step 706 in which the monitor process transmits the details of the event to the event process 608 using an appropriate messaging protocol such as HTTP.

The event process 608 then queries the database 152, in accordance with step 708 to determine if any interested parties/group members are implicated by the event with respect to the particular volume or device. Note that a given volume may implicate multiple groups. If the database 152 contains entries relating to the volume, this data is returned to the event process 608. These entries can include web links for related information (described below) and e-mail addresses for the interested parties.

In accordance with step 710, the event process 608 uses appropriate APIs 610 to generate e-mail messages to each interested party retrieved from the database with respect to the implicated group or groups. The e-mails can be transmitted using the SMTP protocol, and show up as e-mailed alerts on the events in the interested parties' inboxes 612. In this manner, specific administrators and others are immediately informed of any critical information involving volumes directed related to their group or themselves. The management station can include an appropriate e-mail server application, interacting with the event process, to facilitate the e-mail function. Alternatively, the notification of an event can take the form of an alarm, alert, telephone call, page or other messaging mechanism to an interested party that is implemented through appropriate automated systems.

In accordance with step 712, the database 152 is also queried by a command process 614. This process uses a common gateway interface (CGI) to generate web-based reports on particular volumes. The CGI is used as an interface between the command process 614 and its associated command tools and a web server 616. The volume information is accessed via the web server 616, which provides web content (including web pages 617) through a web browser application 618 resident on the computer console of the administrator (via GUI 144), and/or on the client displays of other interested parties. The content can be displayed in any acceptable and useful form including graphs as described further below. Note that the decision step, in absence of a particular event or alert, branches to step 712, in which updated statistics on volumes can be obtained at any time by group members and the administrator via web pages.

It is contemplated that various access control limitations may be placed on members of a group when appropriate. The administrator can set certain access control limitations through the database or web server. A governing access control list (ACL) can reside on the database 152 (or elsewhere) for this purpose. Permitted individuals can access the information, including specific event information in accordance with step 714.

As part of the event notification/reporting process, e-mails to interested parties can include conventional web links 620 to the web pages on volume statistics or to outside web-links accessed via, for example, the Internet. These links can be routed through the web server 616 and/or through another network switching appliance connected to the LAN (e.g. router 108). By accessing the links, interested parties can bring up the relevant statistical data on the affected volume or another utility, such as an application (e.g. a repair program) that is designed to diagnose or address the problem that triggered the alert/event.

The graphical user interface (GUI) displayed to the administrator and interested parties is shown in further detail in FIGS. 8-12. It is expressly contemplated that a variety of formats and organizational schemes for displaying and manipulating data can be employed. The version described herein is only one possible arrangement.

Figure 8:
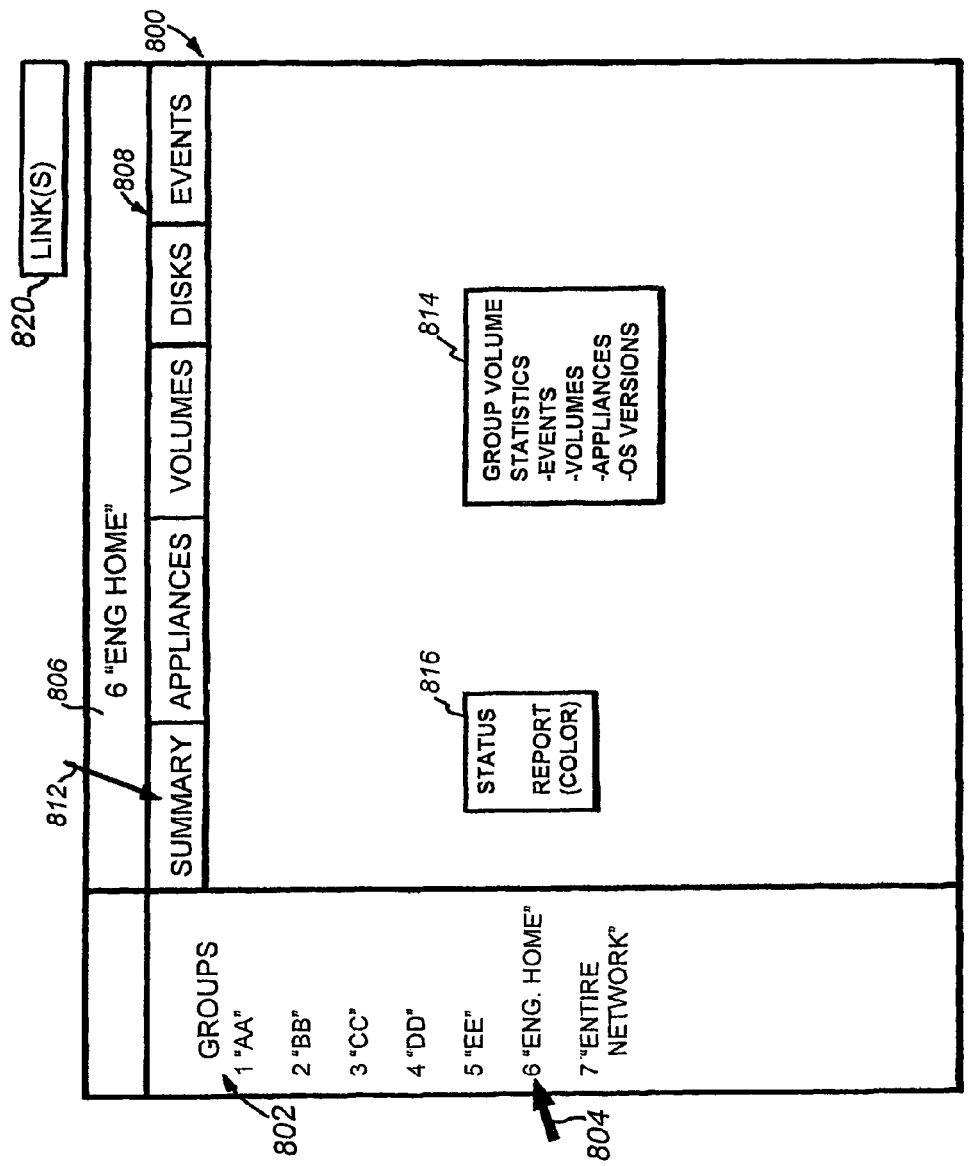
FIG. 8 is a plan view of a graphical user interface display showing a group volume statistics summary according to an embodiment of this invention.

FIG. 8 shows a GUI window 800 that displays the basic summary information for a particular predefined group. Established groups are displayed in the section or box 802. In this example Group 6 "ENG. HOME" has been selected by cursor 804. The selected group title is shown in the box 806. The available report displays include a group summary window, a group appliance window, a group volume window, a group volume disk window and a group event window. Note that the entire network can be one of the "groups" as shown by the menu selection for Group 7 "ENTIRE NETWORK" (807) in the group box 802.

A particular report within the GUI is selected using the respective tab in the menu 808. In this example, the Summary 810 tab is selected by cursor 812. The depicted summary 800 window lists all volume statistics 814 associated with the group, including, for example, events, volumes, appliances and operating system (OS) versions present within the group. A separate status box 816 is provided this can include specific alert/event information related to particular volumes or devices. The box can be color coded to show the significance of the status alert or event. For example, a green box may indicate all clear, while a yellow box may denote potential problems and a red box may denote immediate trouble. Additional, or different colors or patterns, may also be employed in the status box and elsewhere. A link box or tab 820 may also be provided that can direct the operator/viewer to further reports, help sites or repair applications.

Figure 9:
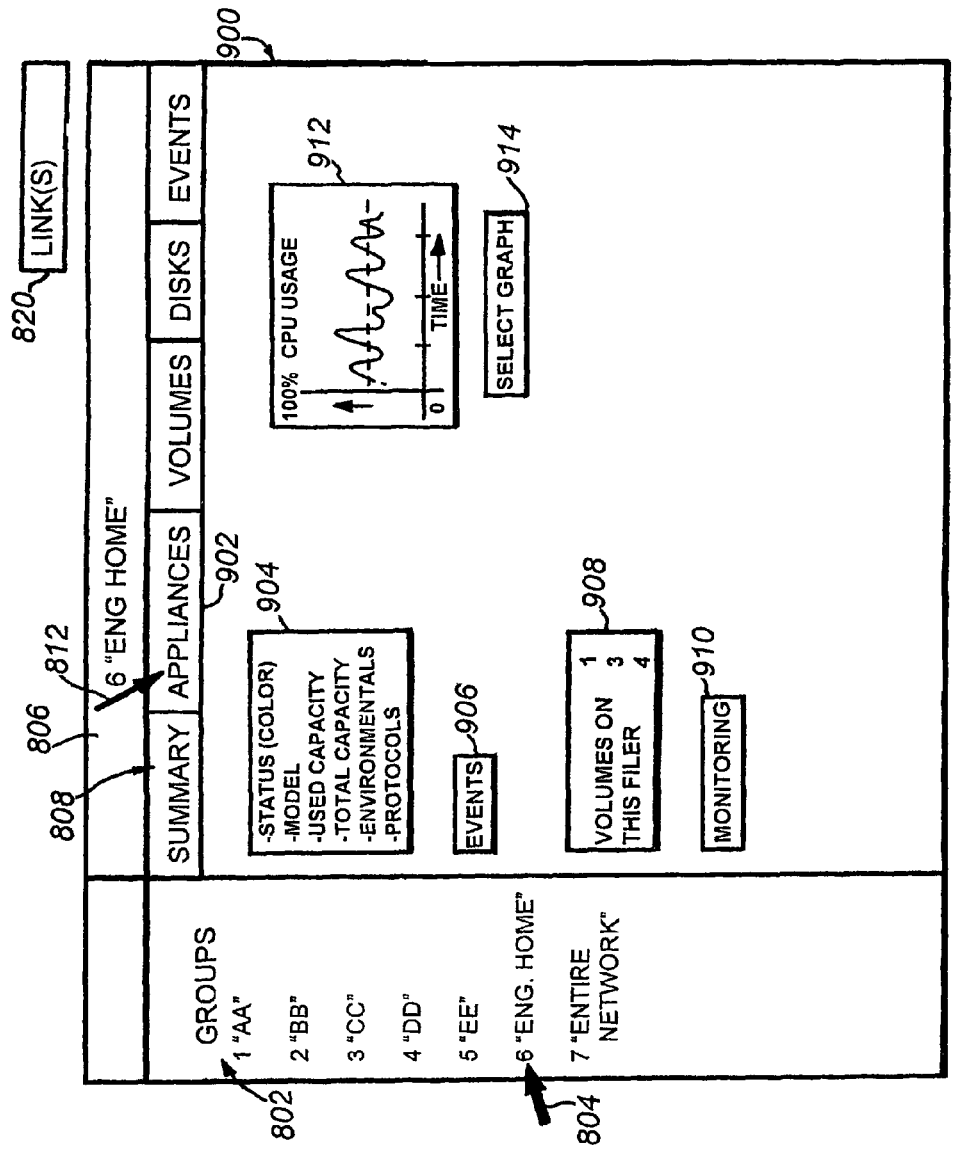
FIG. 9 is a plan view of the graphical user interface display showing the statistics for a selected appliance of the volume group according to an embodiment of this invention.

FIG. 9 shows a GUI window 900 in which a particular group appliance (e.g. filer) has been selected by directing cursor 812 to the Appliance tab 902 in the menu 808. The window 900 depicts filer information in box 904 such as overall status (with color), model, used capacity for storage, total capacity, environmental information and protocols used/present. In addition relevant events are displayed in the event box 906. The present volumes on the filer are depicted in the volume box 908 and a monitoring box 910 can show various monitor process data collected for the implicated appliance, including "ping" status, group or network status, disk free space, system contact information, operation counts and CPU usage. The time of the most recent sample and polling interval for each type of data can also be displayed. In addition a graph box is provided. The graph can show relevant appliance performance data for a given category and time period based upon the graph selection box 914.

Figure 10:
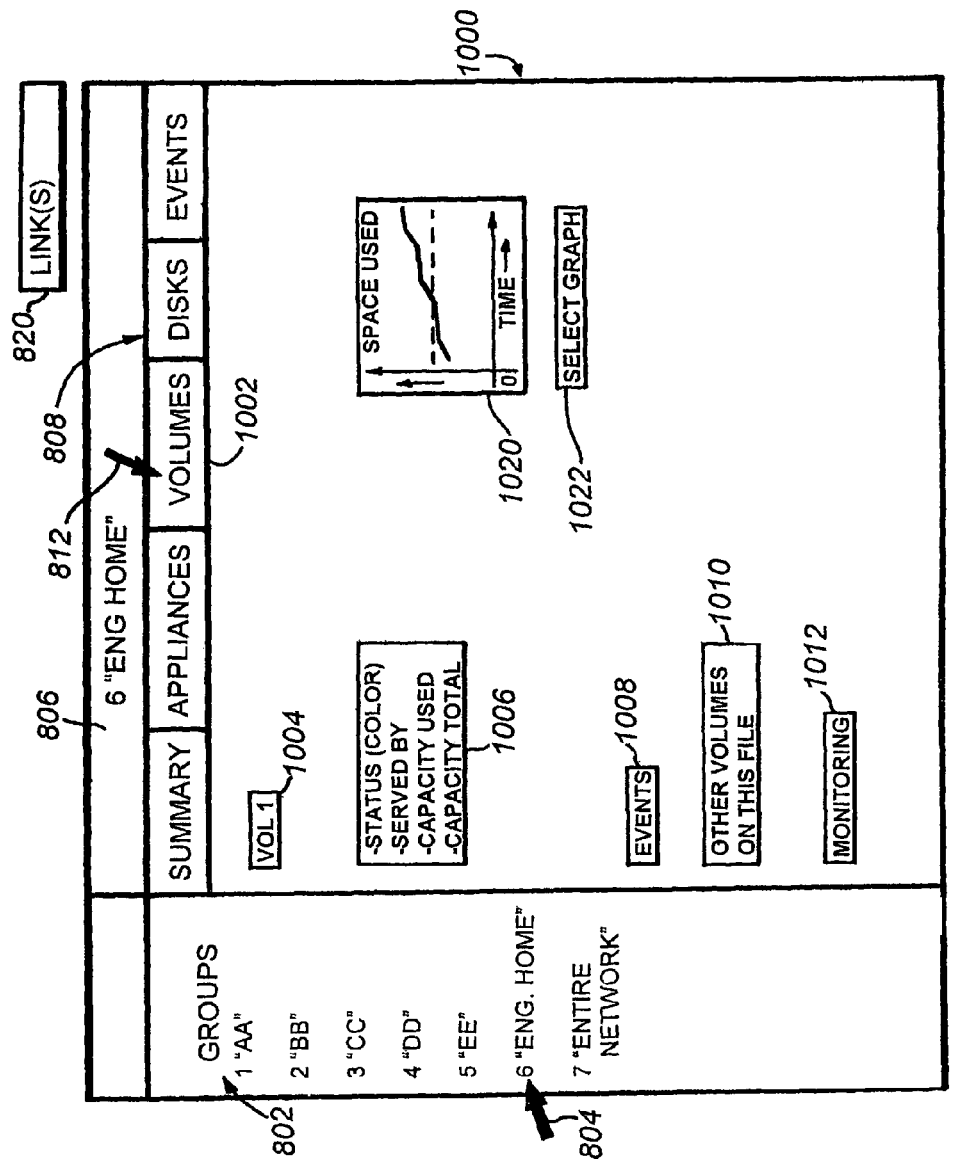
FIG. 10 is a plan view of the graphical user interface display showing statistics for a selected volume of the volume group according to an embodiment of this invention.

FIG. 10 shows a GUI window 1000 in which a particular volume has been selected by directing cursor 812 to the Volumes tab 1002. This window displays the selected volume in box 1004. The box 1006 shows status with color, the filer serving the volume, the storage capacity of the volume in use and the total available capacity. In addition, events, if any, are displayed in the event box 1008. Other volumes served by the associate filer are also shown in the box 1010. A monitoring box 1012, showing relevant monitor process information and associated times/intervals, is also provided. In this example, ping and free space are collected. Finally, performance graphs are available in graph box 1020. These graphs can be selected using the select graph box 1022.

Note that a variety of additional pull-down menus for displaying data according to various formats can also be provided. The depicted windows are only by way of example and further, or differing, display formats can be provided including lists with rows and columns for various reporting parameters, etc.

Figure 11:
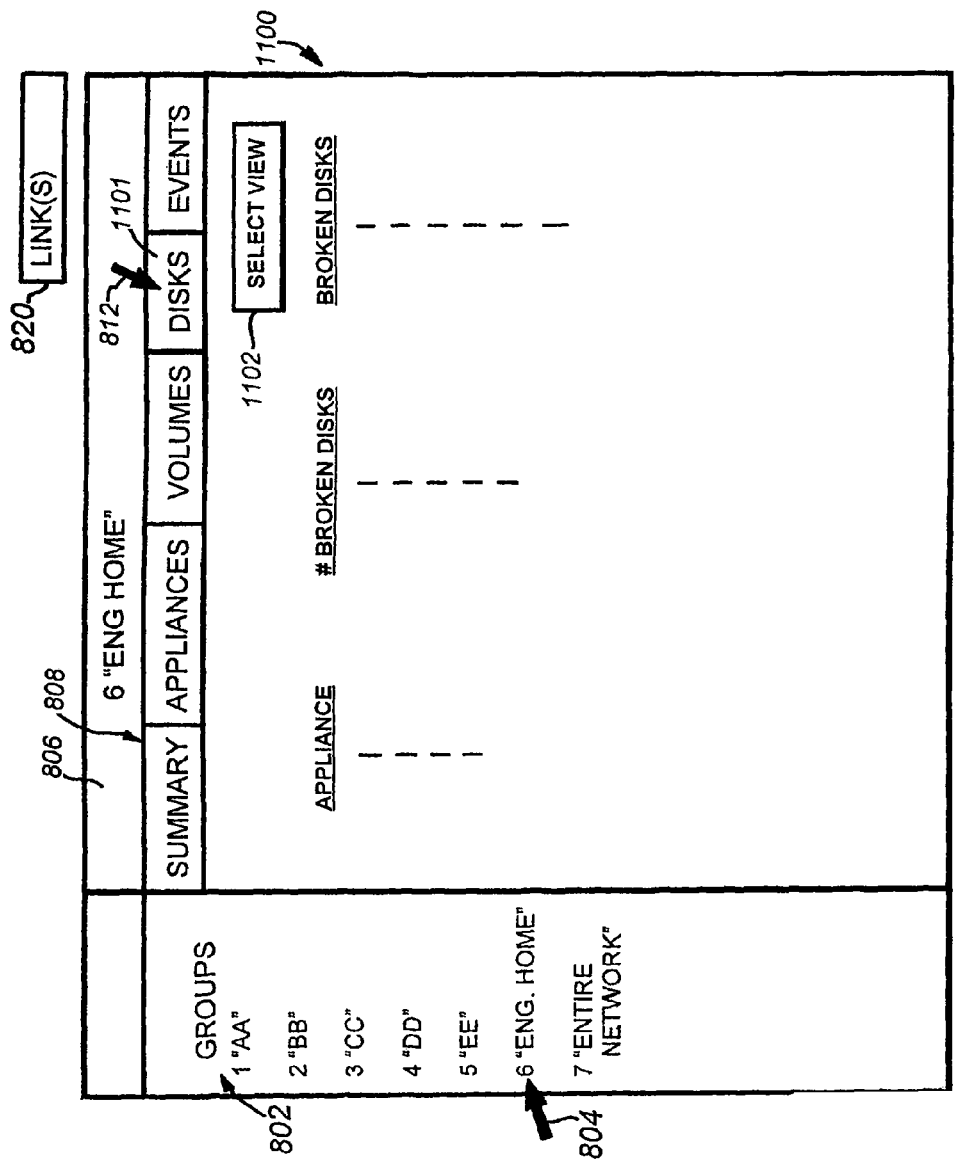
FIG. 11 is a plan view of the graphical user interface display showing statistics for a selected disk or disks of the volume group according to an embodiment of this invention.

FIG. 11 shows a GUI window 1100 in which the status of one or more disks for a given group are selected using the cursor 812 on Disks tab 1101. The list of disks can be varied based upon criteria in the selection box 1102. In this example, broken disks are selected. These are listed based upon their appliance (filer) and the number of disks broken particularly associated with the appliance. Other selection categories such as working disks or overfilled disks can also be used to select a list.

Figure 12:
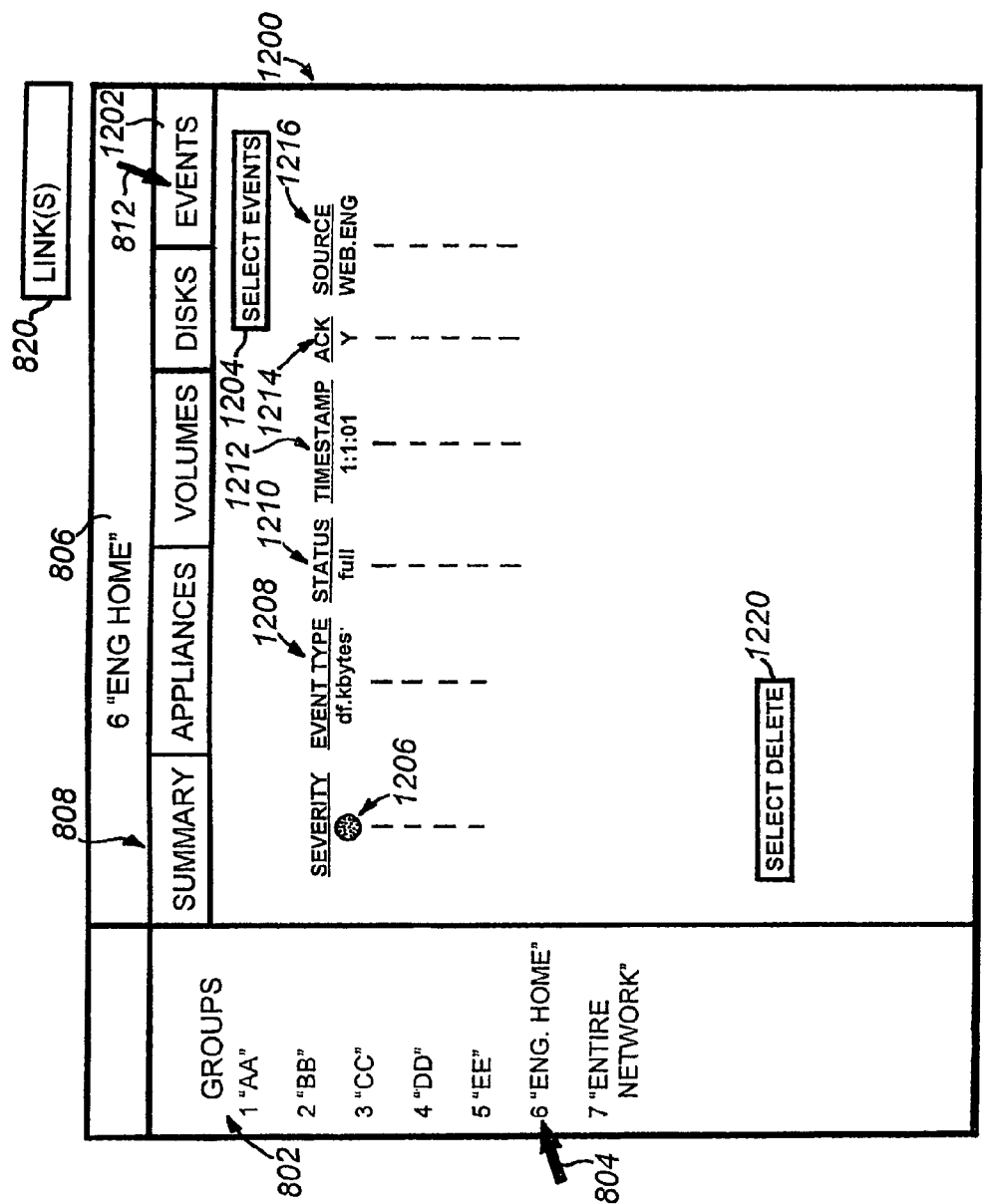
FIG. 12 is a plan view of the graphical user interface display showing selected events for the volume group according to an embodiment of this invention.

FIG. 12 shows a GUI window 1200 in which events in connection with the group are listed using the cursor 812 on Events tab 1202. The select events box 1204 allows the viewer to select events based upon certain criteria such as criticality (e.g. all events that are "critical or worse"). Such events are listed with a severity indicator 1206 that can include an appropriate alert color. In addition the list can show the event's type 1208, the status of the volume 1210, the event timestamp 1212, whether an acknowledgement by an operator has been made (1214), and the source event (e.g. the group or volume) 1216. Following review and/or acknowledgement, each event listing can be deleted by highlighting it and applying the Select Delete tab 1220.

The GUI can include further utilities such as a group edit window that enables an operator to add or delete volumes and/or interested parties from a group, and to change relevant addresses, links and thresholds.

Figure 13:
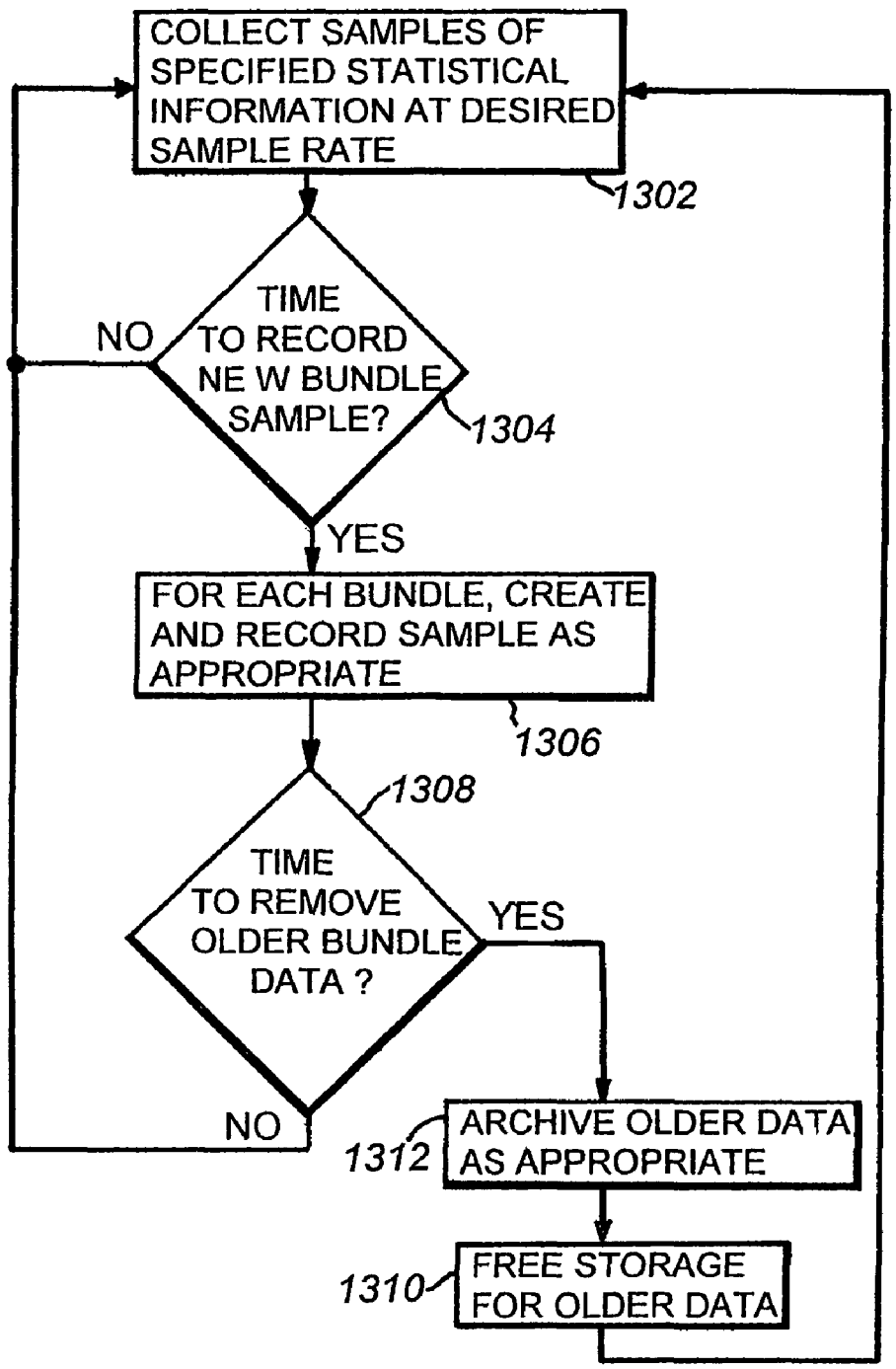
FIG. 13 is a flow diagram of a generalized procedure for efficiently organizing, storing and maintaining a set of statistical data on the volumes according to an embodiment of this invention.
Figure 14:
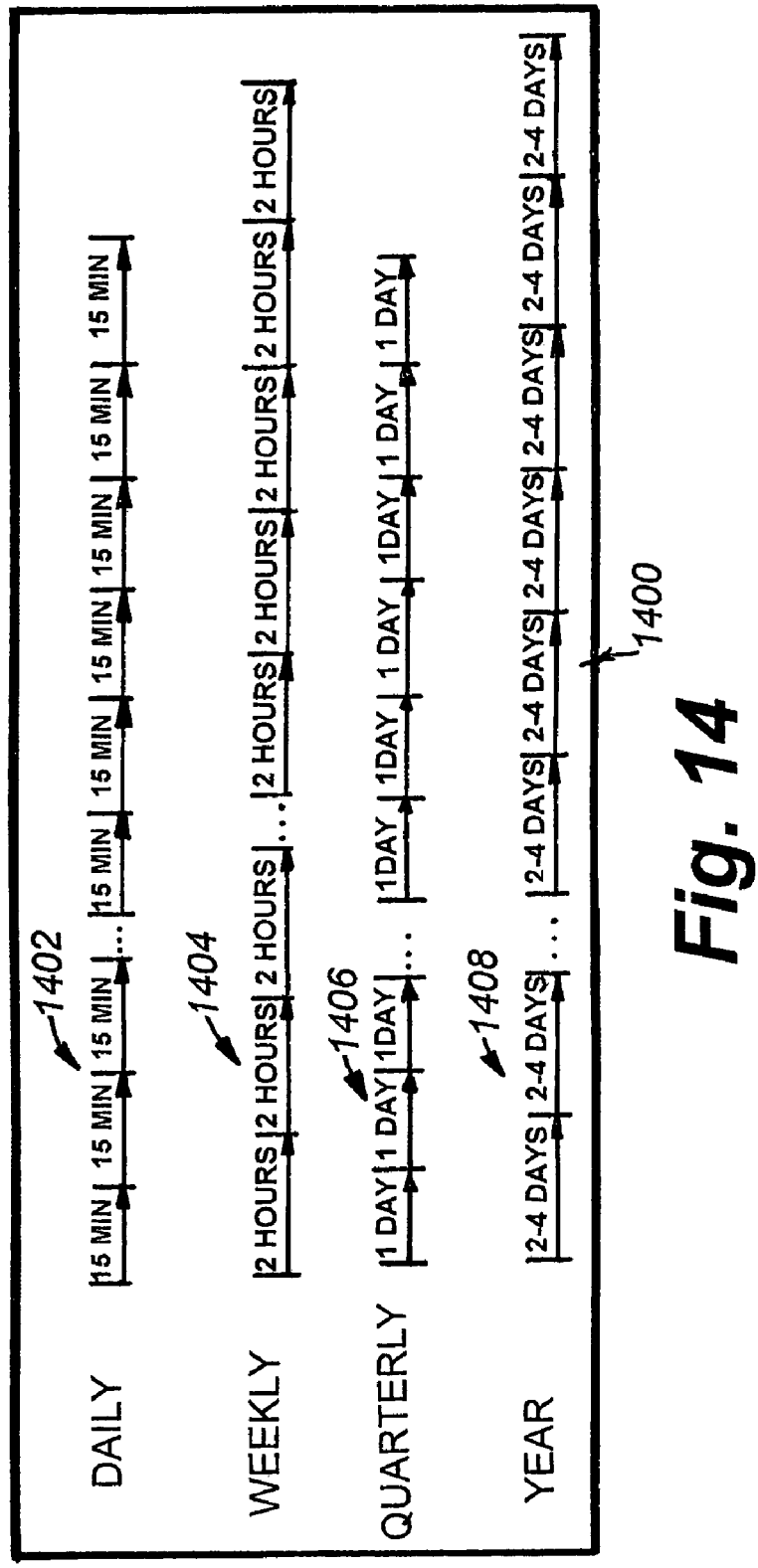
FIG. 14 is a schematic diagram of a scheme for implementing the organization, storage and maintenance procedure of FIG. 13.

Performance data, events and other monitor process information in connection with the management station is stored for long time periods (e.g. indefinitely) on the database 152. With continual additions to the data, there is a risk of significantly overfilling the database with voluminous and unnecessary data points. While it is desirable to retain samples over a long period of time (months or years) it is recognized that individual data points typically become less significant, the longer the time interval. Accordingly, FIGS. 13 and 14 depict respectively, a procedure 1300 and associated scheme 1400 for reducing storage requirements for network and group monitor process even where data is stored over a long time period.

According to the storage procedure and associated scheme, the data is divided into time-based bundles. In this example, the bundles represent a daily bundle 1402, a weekly bundle 1404, a quarterly bundle 1406 and a yearly bundle 1408. The exact characteristics of bundles can vary depending upon the desired reporting requirements (i.e. two-months, half-year, etc.). In one example, each bundle includes roughly one hundred data points, although this number can vary significantly from bundle-to-bundle in an alternate embodiment. The intervals are chosen to facilitate this approximate number. Hence the daily bundle has fifteen-minute intervals, the weekly has two-hour intervals, the quarterly has daily data points and the yearly has two to four-day intervals.

Referring to the procedure 1300, the statistical data is collected at a given rate in accordance with step 1302. This sample rate may be every minute, every second or every hour depending upon the characteristics and relative importance of the data. For example, fast-changing data like CPU usage may be collected more frequently than temperature data. When a given bundle's storage interval for any of the bundles has arrived (decision step 1304), then the sample data is condensed into an actual storage sample in accordance with step 1306. The process for condensing a stream of samples into one storage sample, representing the data point for the bundle's interval (fifteen minutes, two hours, one day, etc.), can be accomplished using a variety of techniques. For example, the samples for a given interval can be averaged (according to various statistical algorithms including straight averaging). In a more basic case, a first, last or middle sample from the overall group of samples is used to mark the particular interval.

In order to economize on space, the second part of the procedure determines (decision step 1308) whether enough time has elapsed (for example, more than 100 intervals) to remove older bundle data for each particular bundle. The location the data base for the given bundle freed for restorage, and certain data may be archived if appropriate (steps 1310 and 1312). Archiving is optional and performed periodically on certain specified data.

It should be clear that this scheme causes samples for more recent time periods to be maintained in smaller intervals, while samples for older time periods are maintained at successively longer sample intervals. This reduces the concomitant burden on the database and associated disk storage, while ensuring that statistical data is available for more-recent events—where it may be scrutinized more-closely.

The foregoing has been a detailed description of preferred embodiments of the invention. Various modifications and additions can be made without departing from the spirit and scope of this invention. For example, the management station network location and functional architecture can vary. Additional network devices and storage appliances can be provided. Similarly, it is expressly contemplated that the network may include only a single storage appliance and that volume information is consolidated into groups from volumes on that particular appliance. Other storage architectures, such as storage area networks can also be employed. Also, the GUI can include other utilities and windows beyond those shown and described herein. Furthermore, it is expressly contemplated that the processes and architecture shown described according to this invention can be implemented as software, consisting of a computer readable medium including program instructions executing on a computer; as hardware or firmware implemented using state machines and the like; or as a combination of hardware, software and firmware. Accordingly this description is meant to be taken only by way of example, and not to otherwise limit the scope of this invention.

What is claimed is:

1. A method for managing a computer network, comprising:
   operating a plurality of servers connected to the network, each server of the plurality of servers connected to one or more storage devices;
   organizing a plurality of volumes across the plurality of servers, wherein each volume is a logical arrangement of the one or more storage devices connected to a particular server;
   consolidating two or more selected volumes of the plurality of volumes into a group of volumes using a graphical user interface, wherein at least two volumes in the group of volumes are located on separate servers of the plurality of servers;
   identifying a party interested in statistical information related to operation of the group of volumes using the graphical user interface;
   polling all servers within the group of volumes, by a monitoring process, for statistical information;
   combining statistical information from the servers within the group of volumes in order to provide a statistical information for the group of volumes;
   displaying, on the graphical user interface, the statistical information for the group of volumes;
   comparing the monitored statistical information to a threshold value to determine whether an event has occurred; and
   in response to determining that an event has occurred, notifying the interested party.

2. The method according to claim 1, further comprising:
   determining the identity of the party in response to a predetermined event condition.

3. The method according to claim 2, further comprising:
   setting the threshold value for a parameter of a storage device in the group of volumes; and
   determining the event condition in response to the parameter exceeding the threshold value.

4. The method according to claim 3, further comprising:
   including in the parameters at least one of a central processing utilization level, a storage disk free space, a storage disk used space, and environmental condition, and an operational status.

5. The method according to claim 1, further comprising:
   sending by e-mail to the party a notification of the statistical information related to the selected group of volumes.

6. The method according to claim 5, further comprising:
   including at least one web link in the e-mail for use by the interested party.

7. The method according to claim 1, further comprising:
retaining information with respect to the interested party in a database.

8. The method according to claim 1, further comprising:
reporting the statistical information related to the group of volumes to a web page so that the party can obtain the statistical information by accessing the web page.

9. The method according to claim 1, further comprising:
presenting the statistical information related to the group of volumes through a graphical user interface.

10. The method according to claim 1, further comprising:
placing alerts on the graphical user interface, the alerts identifying a problem condition shown by the statistical information related to the group of volumes.

11. The method according to claim 10, further comprising:
coding the alerts with color to indicate a severity of the problem condition.

12. The method according to claim 1, further comprising:
consolidating the statistical information related to the group of volumes with a statistical information related to an another group of volumes.

13. The method according to claim 1, further comprising:
using a RAID array of disks as a storage device of the one or more storage devices.

14. A computer network apparatus, comprising:
a plurality of servers, each server of the plurality of servers connected to one or more storage devices;
a plurality of volumes stored across the plurality of servers, wherein each volume is a logical arrangement of the one or more storage devices connected to a particular server;
a group of volumes formed by consolidating two or more selected volumes of the plurality of volumes using a graphical user interface, wherein at least two volumes in the group of volumes are located on separate servers of the plurality of servers;
statistical information related to operation of the group of volumes, the statistical information identified as being of interest to a party using the graphical user interface;
a monitoring process used to poll all servers within the group of volumes;
statistical information combined from the servers within the group of volumes in order to provide a statistical information for the group of volumes;
the graphical user interface further configured to display the statistical information for the group of volumes;
the monitored statistical information is compared to a threshold value to determine whether an event has occurred; and
the party is notified if it is determined that an event has occurred.

15. The apparatus according to claim 14, further comprising:
an event condition, the identity of the party determined in response to the event condition.

16. The apparatus according to claim 15, wherein the threshold value is set for a parameter of a storage device in the group of volumes; and
the event condition is determined in response to the parameter exceeding the threshold value.

17. The apparatus according to claim 16, further comprising:
the parameters selected from at least one of a central processing utilization level, a storage disk free space, a storage disk used space, and environmental condition, and an operational status.

18. The apparatus according to claim 14, further comprising:
an e-mail message sent to the party, the e-mail message referring to the statistical information related to the selected group of volumes.

19. The apparatus according to claim 18, further comprising:
at least one web link included in the e-mail message for use by the interested party.

20. The apparatus according to claim 14, further comprising:
a database to retain information with respect to the interested party.

21. The apparatus according to claim 14, further comprising:
a web page to report the statistical information related to the group of volumes so that the party can obtain the statistical information by accessing the web page.

22. The apparatus according to claim 14, further comprising:
a graphical user interface to present the statistical information related to the group of volumes.

23. The apparatus according to claim 22, further comprising:
alerts placed on the graphical user interface, the alerts identifying a problem condition shown by the statistical information related to the group of volumes.

24. The apparatus according to claim 23, further comprising:
color to code the alerts to indicate a severity of the problem condition.

25. The apparatus according to claim 14, further comprising:
the statistical information related to the group of volumes consolidated with a statistical information related to an another group of volumes.

26. The apparatus according to claim 14, further comprising:
a RAID array of disks used as a storage device of the one or more storage devices.

27. A computer readable storage media, comprising:
said computer readable media containing instructions for execution on a processor for the practice of a method of managing a computer network, the method having the steps of,
operating a plurality of servers connected to the network, each server of the plurality of servers connected to one or more storage devices;
organizing a plurality of volumes across the plurality of servers, wherein each volume is a logical arrangement of the one or more storage devices connected to a particular server;
consolidating two or more selected volumes of the plurality of volumes into a group of volumes using a graphical user interface, wherein at least two volumes in the group of volumes are located on separate servers of the plurality of servers;
identifying a party interested in statistical information related to operation of the group of volumes using the graphical user interface;
polling all servers within the group of volumes, by a monitoring process, for statistical information;
combining statistical information from the servers within the group of volumes in order to provide a statistical information for the group of volumes;
displaying, on the graphical user interface, the statistical information for the group of volumes;

comparing the monitored statistical information to a threshold value to determine whether an event has occurred; and in response to determining that an event has occurred, notifying the interested party.

28. A system, comprising:

a plurality of storage appliances, wherein each storage appliance is configured with at least one volume and each volume is a logical arrangement of a plurality of storage devices;

a management station executing on a separate server from the plurality of storage appliances, the management station configured to access usage and performance information on the plurality of storage appliances and associated volumes;

a graphical user interface (GUI) connected to the management station, the GUI configured to allow a user to organize two or more volumes from the plurality of storage appliances into a group of volumes, and the GUI configured to display statistical information relating to the group of volumes, wherein at least two volumes in the group of volumes are located on separate storage appliances of the plurality of storage appliances;

statistical information combined from the storage appliances within the group of volumes in order to provide a statistical information for the group of volumes;

a management station storage device connected to the management station, the management station storage device configured with a database, the database storing the statistical information for the group of volumes and a threshold value associated with statistical information for ef the group of volumes; and the management station further configured to compare monitored statistical information for the group of volumes with the threshold value and determine that an event has occurred when the monitored statistical information exceeds the threshold value and to notify an interested party of the event.

29. The system of claim 28, wherein the statistical information stored on the database is bundled in various time periods of days, weeks, quarters, or years that each have roughly a same number of intervals, each bundle having a different relative time span between respective intervals to have samples for more recent time periods maintained in smaller intervals, while samples for older time periods are maintained at successively longer sample intervals.

30. The system of claim 28, wherein the management station is connected over a LAN to the plurality of storage appliances.

31. The system of claim 28, wherein each volume is formed from two or more RAID groups within the plurality of storage devices.

32. The system of claim 28, wherein the interested party is notified by an email, alarm, alert, telephone call, or page that is sent using an automated system.

33. The system of claim 28, wherein the interested party is one or more users, administrators, or managers.

34. The system of claim 28, further comprising:

a command process that generates displays on the statistical information using a web-based format that is accessed by a browser on the management station's graphical user interface or on an interested party's client display.

* * * * *

UNITED STATES PATENT AND TRADEMARK OFFICE
CERTIFICATE OF CORRECTION

PATENT NO. : 8,171,414 B2
APPLICATION NO. : 09/862949
DATED : May 1, 2012
INVENTOR(S) : Brian M. Hackworth Page 1 of 1

It is certified that error appears in the above-identified patent and that said Letters Patent is hereby corrected as shown below:

In col. 15, line 32 should read as follows:
For ~~of~~ the group of volumes; and Signed and Sealed this
Sixth Day of November, 2012

David J. Kappos
*Director of the United States Patent and Trademark Office*